United States Patent [19]
Morse et al.

[11] 3,958,017
[45] May 18, 1976

[54] BEVERAGE CONTAINING STABILIZED VITAMIN C AND IRON AND METHOD OF MAKING SAME

[75] Inventors: Lewis D. Morse, Princeton; Paul A. Hammes, Westfield, both of N.J.

[73] Assignee: Merck & Co., Inc., Rahway, N.J.

[22] Filed: Nov. 15, 1974

[21] Appl. No.: 524,299

Related U.S. Application Data

[63] Continuation-in-part of Ser. No. 391,111, Aug. 27, 1973, abandoned, which is a continuation-in-part of Ser. No. 154,596, June 18, 1971, abandoned, which is a continuation-in-part of Ser. No. 72,855, Sept. 16, 1970, abandoned, which is a continuation-in-part of Ser. No. 50,911, June 29, 1970, abandoned, which is a continuation-in-part of Ser. No. 858,892, Sept. 17, 1969, abandoned.

[52] U.S. Cl. .................................. 426/72; 424/175; 426/74; 426/590; 426/654
[51] Int. Cl.² ............................................ A23L 1/30
[58] Field of Search ............. 426/72, 190, 364, 218, 426/206, 212, 311, 365, 74, 590, 599, 654, 656, 657, 544, 545, 541; 424/280, 295, 319, 175, 147; 260/343.7

[56] References Cited
UNITED STATES PATENTS

| | | | |
|---|---|---|---|
| 2,411,636 | 11/1946 | Preiswerk | 424/280 |
| 2,634,210 | 4/1953 | Kimball | 426/74 X |
| 2,694,719 | 11/1954 | Opplt | 424/175 |
| 3,298,838 | 1/1967 | Villarreal | 426/311 |
| 3,652,290 | 3/1972 | Hammes et al. | 426/190 X |
| 3,689,641 | 9/1972 | Spangler et al. | 426/218 X |
| 3,697,287 | 10/1972 | Winitz | 426/218 X |

OTHER PUBLICATIONS

Sinclair; "The Orange"; 1961; pp. 73, 80–83, 241–258.
Spanyar et al.; "Stabilization of Vitamin C in Foodstuffs"; Z. Lebensmitt–Untersuch; Vol. 129; pp. 133–139; 1966.
Reder; "Inhibition of Oxidation of Ascorbic Acid"; Chem. Abst. Vol. 40; pp. 2238–2239; 1946.
Fujimura; "Biochemistry of L Ascorbic Acid"; Chem. Abst. Vol. 46; pp. 4587–4588; 1946.
Esselen et al.; "Fortification of Fruit Juices with Ascorbic Acid"; Fruit Prod. Jour. and Amer. Food Mfg.; 9–1946.

*Primary Examiner*—S. Leon Bashore
*Assistant Examiner*—Kenneth M. Schor
*Attorney, Agent, or Firm*—Rudolph J. Anderson, Jr.; Harry E. Westlake, Jr.; Frank M. Mahon

[57] ABSTRACT

Vitamin C in beverages such as natural and manufactured fruit and vegetable flavored drinks is stabilized by addition of controlled quantities of cysteine without adverse effects on taste. More especially, beverages containing both Vitamin C and metabolically available iron are stabilized by addition of cysteine, all in specific ratios.

15 Claims, No Drawings

BEVERAGE CONTAINING STABILIZED VITAMIN C AND IRON AND METHOD OF MAKING SAME

This application is a continuation-in-part of prior co-pending application, Ser. No. 391,111, filed Aug. 27, 1973, now abandoned which in turn is a continuation-in-part of prior application, Ser. No. 154,596, filed June 18, 1971, now abandoned, which application is in turn a continuation-in-part of prior application Ser. No. 72,855, filed Sept. 16, 1970, now abandoned, which application is in turn a continuation-in-part of prior application Ser. No. 50,911, filed June 29, 1970, now abandoned, which application in turn is a continuation-in-part of prior application of Ser. No. 858,892, filed Sept. 17, 1969, now abandoned.

This invention relates to beverages which contain Vitamin C and particularly to a novel way of stabilizing this vitamin against deterioration. The invention is of especial value in protecting the Vitamin C against the destructive action of nutritionally assimilable iron, if it is also present.

The beverage may be a natural or manufactured, fruit or vegetable drink containing Vitamin C. By a natural drink is meant the whole, concentrated or diluted juice from oranges, lemons, grapefruit, grapes, carrot, prunes, tomatoes and other produce which is squeezed or crushed to supply a beverage which naturally contains an appreciable amount of Vitamin C. It may be fortified with added Vitamin C and mixtures of different juices may be made. By a manufactured drink is meant one that is wholly or partially flavored with a synthetic flavoring agent and to which Vitamin C has been added to supply all or nearly all of its Vitamin C content.

Of the several known vitamins, Vitamin C is recognized as a most important one, as its inadequate consumption produces various human ills, one of which is scurvy. As it is very water soluble, it is readily excreted and consequently it is important that it be consumed every day. It is generally accepted that for adults the recommended daily allowance is 60 mg.

Despite the human need for Vitamin C, many persons are reported to be receiving an inadequate daily intake even though it is available in substantial amounts in many fruits and vegetables. To help satisfy a widespread need for Vitamin C, it has been added to the various beverages mentioned above and particularly to the packaged beverages sold in stores. However, the Vitamin C activity deteriorates in the package during storage and even after the package is opened and is awaiting complete consumption. For instance, it has been considered advisable to add Vitamin C to packaged drinks wherein the flavor is mostly or all synthetic, but it has been found that the other ingredients ordinarily present hasten Vitamin C deterioration.

Vitamin C is also known to have an adverse effect on ingredients which sometimes are added to the packaged beverage. An illustration of this is certain dyes which are added to give the beverage a more natural or a more attractive color. The chemical incompatability of the dye in the presence of the Vitamin C will cause the dye to fade during storage of the packaged beverage. The present invention includes as one of its features the discovery that by stabilizing the Vitamin C, its deteriorating action on the dye or other labile substances is over come or minimized.

Mention has been made above of the fact that Vitamin C is stabilized by the present invention against the destructive action of iron in an elemental or compound form. This is important because there are an increasing number of reports of the widespread need for additional iron in the daily diet. One such recent report is entitled "Iron Deficiency in the United States" by the Committee on Iron Deficiency of the Council on Foods and Nutrition of the American Medical Association in which the recommended daily dietary allowance for human adults is 10 to 18 milligrams.

It is apparent that if beverages and especially packaged beverages can be fortified with iron, this would serve as an ideal medium to supply iron to children and adults. The present invention makes it possible to add iron to both natural and manufactured beverages, which naturally contain Vitamin C or which have been fortified with Vitamin C. For instance, ferrous sulfate could be added to freshly made orange or tomato juice as well as to canned or frozen preparations thereof. These preparations may be in their whole form or may be concentrated so that they are to be reconstituted with added water for consumption.

In accordance with the present invention, it has been found that cysteine, when added in a carefully controlled amount relative to the Vitamin C and to the total volume of the packaged beverage, serves to adequately overcome deterioration of the Vitamin C. Moreover, it has been found that within this range of added cysteine the taste and the color of the beverage is not adversely affected. The HCl salt or other physiologically acceptable salt of cysteine may replace cysteine itself.

The use of cysteine to protect Vitamin C has been proposed in the prior art but added cysteine has not been used in beverage preparations apparently because of its alleged bad taste. This negative teaching has evidently had the effect of preventing the use of added cysteine as a stabilizer in beverages which contain naturally present Vitamin C and/or cysteine or which are fortified with this vitamin.

In an article by P. Spanyar et al. appearing in Z. Lebensmittel-Untersuchungund-Forschung 129, No. 3, 133–139 (1966) entitled "Stabilization of Vitamin C in Foodstuffs", it is stated: "In practice it is impossible to use cysteine for stabilizing the Vitamin C content of foodstuffs because of its peculiar taste and smell which is noticeable in most foodstuffs, even when present in relatively small concentration; for example, fruit juices with cysteine content of 15–20 mg./kg. are undrinkable. " Since it was thought that such a preparation is unpalatable, the article seemingly dismisses it and continues with a report which investigates the use of several esters and the hydrochloride of cysteine.

An earlier article in the same journal, 120, No. 1, 1–17 (1963) describes tests involving the use of cysteine to overcome oxidation of Vitamin C but the article is an elaborate study of the adverse effects of other agents such as copper and iron. If it made any contribution to the art in 1963, it was totally negated by the 1966 article mentioned above.

Another article is that by Zwolinska in Farmacja Polska, 18, No. 22, 548–549 (1962) entitled "Stabilization of Vitamin C Solutions in Ampules." These are high Vitamin C concentrations for injection, i.e. "10% solutions of Vitamin C", obviously for administration by a syringe, and not for use as a beverage. Obviously, taste is not a factor in an injectable preparation. It would not be flavored or have other Vitamin C attacking agents present, and it would not stand open waiting for consumption like a beverage. The test ampules contain 0.1 and 0.5% cysteine, and relative to the Vitamin C, this is 1.0 and 5.0%.

In applying the present invention to a manufactured beverage which is packaged, it has been found that the optimum addition of Vitamin C to the drink in the single strength form, i.e. the dilution in which it is to be drunk, is 0.228 mg./ml. but it may be within the wide range of 0.025 to 1.2 mg./ml. and preferably 0.1 to 0.3 mg./ml. This will provide a person with a considerable portion of the daily need for the vitamin. The invention may be applied equally as well to concentrates, frozen or unfrozen, such as those which require dilution with water after the package is opened to obtain the single strength form. For instance, if the packaged concentrate is to be diluted with three volumes of water (i.e. the concentrate volume is one-fourth of the intended dilution volume), the percent of Vitamin C would be 4 times higher in said concentrate.

Also, in accordance with the invention, the cysteine added to the beverage may be within the wide range of 0.2 to 2.3% by weight of the Vitamin C contained in the beverage. A preferred range for the addition of cysteine is from 0.2 to 1.25% by weight of the Vitamin C and the most preferred range for the addition of cysteine is from 0.3 to 0.9% by weight of the Vitamin C. If a cysteine salt is to be used, cysteine HCl for example, an additional amount must be added to obtain the equivalent amount of cysteine. Applicants have found, surprisingly, that the concentration of added cysteine as noted above in the beverage is not noticeable or objectionable to the taste or smell.

In practicing the invention as it relates to packaged beverages, the Vitamin C and cysteine are mixed into the beverage before it is packaged. The package may be the conventional capped bottle or sealed metal container. On opening the container for consumption, the Vitamin C will assay approximately as high as when it was prepared and this will be true even if there is also present iron or iron compounds or other ingredients which generally tend to deteriorate the Vitamin C.

Iron may or may not be added, but if it is to be present it may be added in its elemental form if it is used in an ultra-fine powdered form, and if it is kept in suspension preferably with a conventional suspending agent. As elemental iron it would broadly constitute from about 0.0007 to 0.07 mg./ml. in the beverage. Concentrations of iron below this cannot truthfully be represented as a beverage fortified with iron. An optimal amount of elemental iron is about 0.007 mg./ml.

Metabolically available iron compounds are preferable to the metallic iron and these may be the anhydrous of hydrated forms of ferrous lactate, -fumerate, -gluconate, -succinate and -sulfate. Ferric compounds which may be used are ferric chloride, -phosphate and -ammonium citrate. A sufficient weight of the selected iron compound would be used to supply an amount of iron ion within the range mentioned above.

In applying the invention to the freshly obtained juice of fruits and vegetables, e.g., orange and tomato juice, the cysteine is added so that with respect to the natural Vitamin C content, the cysteine amounts to the above optimal percent or comes within the mentioned preferred ranges or broad range. Of course, if the whole, fresh juice is fortified with added Vitamin C, the amount of cysteine added would be based on the resulting total Vitamin C. If the fresh juice is concentrated, irrespective of whether it is or is not frozen, the added cysteine would be based on Vitamin C content as mentioned above. In each case due allowance also is made for any free cysteine which may naturally occur in the juice.

Representative examples are the following:

EXAMPLE 1

Experimental and control beverages were prepared in a large commercial beverage bottling and canning plant. Both experimental and control batches were packed in quart cans.

The experimental and control batches for testing were prepared from regular products of the line as follows:

Experimental (Treated) Batches

The experimental beverages were prepared by adding to the line product, per 6 fluid ounces, a mixture of ascorbic acid, ferrous sulfate and cysteine hydrochloride as shown below:

| | mg./6 Fluid Ounces |
|---|---|
| Ascorbic Acid | 51.56 |
| | (0.29 mg./ml.) |
| Ferrous Sulfate (dried) | 11.215 |
| | (0.020 mg./ml.) |
| | (as Fe) |
| Cysteine Hydrochloride, Anhydrous | 0.459 |
| | (0.002 mg./ml.) |
| | (as free cysteine) |

Control (Untreated) Batches

The control batches were prepared by adding to the line product, per 6 fluid ounces, 51.56 mg. of ascorbic acid (0.29 mg./ml.). No cysteine hydrochloride or ferrous sulfate was added to the control batches.

Assay of the line product prior to fortification with the ascorbic acid, ferrous sulfate and cysteine hydrochloride mixture (experimental batches) or with ascorbic acid alone (control batches), showed that the line products contained from 0.0 to 18.274 mg./6 oz. of indigenous Vitamin C (0.0 to 0.103 mg./ml.). Each experimental batch, therefore, contained per 6 fluid ounces:

| | mg./6 Fluid Ounces |
|---|---|
| Ascorbic Acid | 51.56 to 69.844 |
| | (0.29 to 0.39 mg./ml.) |
| Cysteine Hydrochloride, Anhydrous | 0.459 |
| | (0.002 mg./ml.) |
| | (as free cysteine) |
| | (0.505 to 0.685%) |
| | (free cysteine by) |
| | (weight Vitamin C) |

The experimental and control batches were assayed for Vitamin C content after fortification and it is the initial assay concentration rather than the theoretical concentration shown above which is employed as the comparison standard in the date tables to follow. The theoretical and assay concentrations closely correspond.

No initial assay for iron was made prior to testing. It is apparent, however, from the data tables to follow that all batches contained some quantity of indigenous iron. The quantity of iron shown for the control batches represents indigenous iron and the quantity of iron shown for the experimental samples represents indigenous plus added iron. Iron assay was discontinued after the two month test period.

Some of the beverage batches were stored at room temperature, and others at 38°C. They were analyzed for ascorbic acid after storage for varying times as shown in the following table. The letter, T, in the initial Vitamin C concentration column indicates the experimental (treated) batch and the letter, C, in that column indicates the control (untreated) batch.

concentration of iron than did the control samples. At the end of 1 month, and at the end of 6 months, taste tests demonstrated no significant difference in taste between the treated and the control samples. The samples at the 6 month storage period were visually observed for color change and most of them, treated or non-treated, showed no difference from the original; however, the table shows some changes in some instances.

| Sample Flavor | Vit. C Initial γ/ml. | 1 Month Room Temp. | | | | 2 Months Room Temp. | | 6 Months Room Temp. | | | 9 Mo. RT | | 6 Months 38°C. | |
|---|---|---|---|---|---|---|---|---|---|---|---|---|---|---|
| | | Vit. C γ/ml | Iron γ/ml | Taste | Color | Vit. C γ/ml | Iron γ/ml | Vit. C γ/ml | Taste | Color | Vit. C γ/ml | Vit. C γ/ml | Taste | Color |
| Orange | T 332 | 288 γloss 44 % loss 13.25 | 29.8 | no significant difference | no difference be- | 265 γloss 67 % loss 20.18 | 34.3 | 200 γloss 132 % loss 39.76 | no difference be- | No Change | 104 γloss 228 % loss 68.67 | 136 γloss 196 % loss 59.03 | no significant change be- | No Change |
| | C 332 | 242 γloss 90 % loss 27.1 | 9.1 | be- tween treated and controls | tween treated and controls | 235 γloss 97 % loss 29.2 | 9.3 | 176 γloss 156 % loss 46.99 | tween treated and controls | No Change | 100 γloss 232 % loss 69.87 | 260 γloss 72 % loss 21.68 | tween treated and controls | No Change |
| Citrus Drink | T 290 | 265 γloss 25 % loss 8.62 | 26.6 | no significant difference | no difference be- | 248 γloss 42 % loss 14.48 | 25.7 | 210 γloss 80 % loss 27.59 | no difference be- | No Change | 110 γloss 180 % loss 62.07 | 234 γloss 56 % loss 19.31 | no significant change be- | No Change |
| | C 290 | 280 γloss 10 % loss 3.45 | 4.5 | be- tween treated and controls | tween treated and controls | 256 γloss 34 % loss 11.72 | 5.8 | 200 γloss 90 % loss 31.0 | tween treated and controls | No Change | 206 γloss 173 % loss 59.66 | 117 γloss 84 % loss 28.96 | treated and controls | No Change |
| Cherry | T 330 | 270 γloss 60 % loss 18.18 | 45.5 | no significant difference | no difference be | 250 γloss 80 % loss | 41.1 | 200 γloss 130 % loss 39.39 | no difference be- | Lighter | 104 γloss 226 % loss 68.48 | 254 γloss 76 % loss 23.03 | no significant difference | Lighter |
| | C 330 | 292 γloss 38 % loss 11.5 | 22.4 | be- tween treated and controls | tween treated and controls | 248 γloss 82 % loss 24.85 | 18.2 | 240 γloss 90 % loss 27.27 | tween treated and controls | No Change | 97 γloss 233 % loss 70.61 | 184 γloss 146 % loss 44.24 | be- tween treated and controls | No Change |
| Orange/ Pineapple | T 356 | 320 γloss 36 % loss 10.11 | 27.8 | no significant difference | no difference be- | 300 γloss 56 % loss 15.73 | 29.8 | 238 γloss 118 % loss 33.15 | no difference be- | No Change | 141 γloss 215 % loss 60.39 | 270 γloss 86 % loss 24.15 | no significant difference | No Change |
| | C 356 | 290 γloss 66 % loss 18.54 | 13.5 | be- tween treated and controls | tween treated and controls | 265 γloss 91 % loss 25.56 | 5.1 | 148 γloss 208 % loss 58.43 | tween treated and controls | No Change | 116 γloss 240 % loss 67.42 | 306 γloss 50 % loss 14.04 | be- tween treated and controls | No Change |
| Pineapple/ Grapefruit | T 408 | 360 γloss 48 % loss 11.76 | 29.8 | no significant difference | no difference be- | 335 γloss 73 % loss 17.89 | 32.8 | 284 γloss 124 % loss 30.39 | no difference be- | No Change | 112 γloss 296 Change | 340 γloss 68 % loss 72.55 | no significant % loss 16.66 | No Change difference |
| | C 408 | 280 γloss 128 % loss 31.37 | 7.7 | be- tween treated and controls | tween treated and controls | 255 γloss 153 % loss 37.50 | 6.2 | 206 γloss 202 % loss 49.5 | tween treated and controls | Slightly Lighter | 130 γloss 278 % loss 68.14 | 236 γloss 172 % loss 42.15 | be- tween treated and controls | No Change |

Although the concentration of cysteine employed in the foregoing experiment was not that required for optimal Vitamin C stabilizing effect in the particular beverage systems tested, the treated samples in this regard were either superior to, or not substantially different from, the control samples even though the treated samples each contained a significantly higher

EXAMPLE 2

Experimental beverages were prepared in the laboratory of a large commercial beverage canning plant. Four cases of twelve 46 ounce cans of a regular fruit punch were prepared for test runs and were fortified as shown below:

| Run No. | Vit. C gm./20 gal. | FeSO$_4$ gm./20 gal. | Cysteine HCl gm./20 gal | % Free Cysteine by Wt. Vit. C |
|---|---|---|---|---|
| I | 0 | 0 | 0 | 0 |
| II | 58.97 | 0 | 0 | 0 |
| III | 58.97 | 0 | 0.9582 | 1.25 |
| IV | 58.97 | 0 | 1.9164 | 2.50 |
| V | 58.97 | 2.73 | 0.9582 | 1.25 |
| VI | 58.97 | 2.73 | 1.9164 | 2.50 |

These quantities are designed to provide 184.28 mg. ascorbic acid, 2.7 mg. elemental iron and 2.303 or 4.606 mg. free cysteine per 8 fluid ounces. The beverages contained no color but FD&C Red No. 40 at 50 ppm on a 100% dye basis. In addition to the above ingredients, there was added to each 20 gallon batch 0.39 gm. FeSO$_4$.7H$_2$O and 0.00776 gm. CuSO$_4$.5H$_2$O to yield 1 ppm iron and 25 ppb copper. This was done to adjust the laboratory water used in preparing the test beverages to more nearly correspond to the plant's well water. The beverage samples were pasturized at 195°± 5°F.

Test beverages were stored at room temperature and were analized for ascorbiv acid content, for taste, for color and for pH as shown in the following table.

month period which corresponds to the anticipated shelf-life for such products. Although all of the fortified samples showed more color fade than did the samples containing no added Vitamin C, the fortified and stabilized samples all showed greater color stability than did the samples fortified with Vitamin C alone. With the exception of Sample VI, there was no significant difference in taste between the fortified and unfortified samples, particularly during the anticipated shelf-life period (6 to 9 months). Sample VI, which contained the highest concentration of stabilizer (2.5% free-cysteine by weight of Vitamin C), consistantly scored lowest in the taste tests.

EXAMPLE 3

|  |  | I Control No Ascorbic | II Control With Ascorbic | III Ascorbic + 1X Stabilizer | IV Ascorbic + 2X Stabilizer | V Ascorbic + Fe + 1X Stabilizer | VI Ascorbic + Fe + 2X Stabilizer |
|---|---|---|---|---|---|---|---|
| 1 Mo. R.T. | Vit. C (mg/8 oz) | 8.3 | 173.4 | 166.2 | 168.9 | 166.2 | 161.7 |
|  | % loss | X | 5.91 | 9.82 | 8.36 | 9.82 | 12.26 |
|  | Color | 0.325 | 0.285 | 0.300 | 0.280 | 0.285 | 0.285 |
|  | Taste | 6.1 | 6.0 | 5.9 | 5.7 | 6.1 | 5.0 |
|  | pH | 3.40 | 3.35 | 3.40 | 3.35 | 3.30 | 3.35 |
| 2 Mo. R.T. | Vitamin C | 0 | 154.9 | 162.5 | 168.4 | 166.6 | 156.1 |
|  | % loss | X | 15.95 | 11.83 | 8.63 | 9.60 | 15.30 |
|  | Color | 0.303 | 0.249 | 0.271 | 0.240 | 0.310 | 0.233 |
|  | Taste | 7.1 | 6.3 | 6.5 | 6.5 | 6.1 | 6.3 |
|  | pH | 3.40 | 3.50 | 3.55 | 3.55 | 3.50 | 3.55 |
|  | Iron (mg/8 oz) | 1.50 | 1.67 | 1.67 | 1.84 | 4.43 | 4.43 |
| 3 Mo. R.T. | Vitamin C | 0 | 161.3 | 168.9 | 171.6 | 159.3 | 168.2 |
|  | % loss | X | 12.47 | 8.36 | 6.89 | 13.56 | 8.74 |
|  | Color | 0.290 | 0.260 | 0.275 | 0.260 | 0.245 | 0.250 |
|  | Taste | 5.8 | 5.8 | 5.4 | 5.3 | 5.5 | 4.7 |
|  | pH | 3.0 | 3.2 | 3.2 | 3.2 | 3.2 | 3.2 |
| 4 Mo. R.T. | Vitamin C | 0 | 141.4 | 165.7 | 154.9 | 152.7 | 144.1 |
|  | % loss | X | 23.28 | 10.09 | 15.95 | 17.15 | 21.81 |
|  | Color | 0.241 | 0.216 | 0.206 | 0.220 | 0.205 | 0.231 |
|  | Taste | 5.8 | 5.0 | 4.3 | 5.2 | 5.2 | 4.3 |
|  | pH | 3.1 | 3.2 | 3.0 | 3.2 | 3.1 | 3.1 |
| 6 Mo. R.T. | Vitamin C | 3.5 | 131 | 151 | 158 | 150 | 155 |
|  | % loss | X | 28.92 | 18.07 | 14.27 | 18.6 | 15.90 |
|  | Color | 0.250 | 0.191 | 0.198 | 0.200 | 0.190 | 0.188 |
|  | pH | 3.2 | 3.1 | 3.1 | 3.1 | 3.1 | 3.1 |
| 14 Mo. R.T. | Vitamin C | 0.0 | 101.5 | 108.5 | 108.6 | 112.1 | 109.5 |
|  | % loss | X | 44.93 | 41.13 | 41.07 | 39.16 | 40.59 |
|  | Color | 0.210 | 0.091 | 0.101 | 0.110 | 0.110 | 0.107 |
|  | Taste | 6.0 | 5.0 | 4.3 | 4.5 | 4.8 | 4.0 |
|  | pH | 3.2 | 3.1 | 3.1 | 3.1 | 3.1 | 3.1 |

NOTES: R.T. = Room temperature
Color = 1:1 with Isopropanol; centrifuge and read at 560m$\mu$
Vitamin C added at 184.3 mg/8 fl. oz.; Fe added at 2.7 mg/8 fl. oz.
Taste: Hedonic scale of 9.
% loss: The % loss is calculated using the theoretical 184.3 mg/8 fl. oz. as the reference standard since no initial assay was made. The Vitamin C concentration for sample No. 1, which contained no added Vitamin C, at the 1 Month and 6 Month assay is attributed to trace indigenous Vitamin C or to experimental error or to both.

In these experimental runs, each of the samples fortified with Vitamin C and containing cysteine hydrochloride stabilizer, either with or without added iron, showed marked enhancement of Vitamin C stability as compared to those samples fortified with Vitamin C alone. This is particularly true during the critical 6 to 9

| Ingredient | % by Weight |
|---|---|
| Concentrated Orange Juice (may be frozen) | 5 |
| Sugar | 10 |
| Corn Syrup | 1 |

-continued

| Ingredient | % by Weight |
|---|---|
| Fumaric Acid | 0.04 |
| Citric Acid | 0.02 |
| Color — U.S. Certified | 1 |
| Vitamin C | 0.0340 |
| Cysteine | 0.0002 (0.588% by wt. Vit. C) |
| Water to 100% | |

EXAMPLE 4

Instead of the concentrated orange juice of Example 3, fresh orange juice (or reconstituted frozen orange juice) amounting to 15% of the total may be used.

EXAMPLE 5

For the concentrated orange juice of Example 3, or fresh or reconstituted orange juice of Example 4, is substituted, concentrated or fresh or reconstituted grape, lemon, cherry pineapple, apricot, apple, cranberry, or prune juice or a mixture of two or more of them.

EXAMPLE 6

Instead of the concentrated fruit juice of Example 3, or the concentrated or restored juice of Example 4, there may be substituted an equal weight of a vegetable juice as tomato, celery, carrot, beet, parsley, spinach, green pepper or a mixture of them. These beverages are packaged in the usual manner, i.e. in sealed glass or metal containers.

EXAMPLE 7

For the orange juice of Example 3 and 4 there may be substituted a synthetic liquid or water soluble solid flavoring agent. This may be an artificial orange, cherry, grape, etc., flavor or it may be the natural or synthetic flavoring in the usual cola, root beer, ginger ale and the like beverage which is packaged. A representative apple or berry flavored drink, for instance would contain per ml.:

| | |
|---|---|
| Ascorbic Acid | 0.2906 mg. |
| FeSO$_4$, dried | 0.0632 mg. (0.0200 mg. Fe) |
| Cysteine.HCl | 0.0026 mg. (0.0020 mg. cysteine) (0.688% cysteine by) (wt. Vit. C) |

EXAMPLE 8

Any one of the preparations of the above examples may have three-fourths of its water removed (or only one-fourth of the water added) so that a concentrate is packaged. This would be reconstituted with three volumes of water at the time of consumption. Or, a higher or lower relative concentrate may be packaged, which will require a measurable volume of restoration water.

In any of the Examples 3 to 8, there may be added extremely finely powdered elemental iron or a metabolically available compound as ferrous sulfate as in Example 1. In these examples the amount of ferrous sulfate may vary from zero to 0.22 mg./ml.

EXAMPLE 9

Freshly squeezed orange juice contains about 0.50 mg. of ascorbic acid per ml. To it is added 0.003 mg. (0.6% by weight Vitamin C) of cysteine (from 0.0022 to 0.0115 mg. may be added — 0.44 to 2.3% by weight Vitamin C). This will stabilize the Vitamin C which is naturally present and this is especially important if the orange juice is to be shipped to a distant point for consumption. It may be fortified with added Vitamin C up to a total content of 0.80 mg. and the cysteine added may, if desired, be increased within the percent ranges stated for the invention. If iron is added, it may constitute from 0.007 to 0.07 mg./ml.

EXAMPLE 10

Instead of the orange juice of Example 9, any other whole fruit or vegetable juice or their palatable mixtures may be substituted.

The invention has been described above with special reference to the drinks which are to stand or be stored until consumed, but the invention includes as well a composition of Vitamin C and cysteine, with or without iron, which will be marketed to beverage producing companies so that the composition may be added to the water, flavors, etc. that make up the packaged beverage. The composition contains the following ingredients based on its addition to a ml. of the single strength drink.

EXAMPLE 11

| | |
|---|---|
| Vitamin C | broadly 0.025 to 1.2 mg. preferably 0.1 to 0.3 mg. optimally 0.228 mg. |
| Cysteine | broadly 0.2 to 2.3% of Vitamin C preferably 0.2 to 1.25% most preferred 0.3 to 0.9 |
| Powdered elemental Iron (may be 0%) | broadly 0.0007 to 0.07 mg./ml. optimally 0.007 mg./ml. |

For instance, a composition to be sold would contain, for addition to a ml. of the single strength drink, 0.228 mg. Vitamin C., 0.0014 mg. cysteine and 0.007 mg. of powdered iron but other amounts within the stated ranges could be added. To this composition could, of course, be added compatible coloring or flavoring agents for instance. If a metabolically available iron compound is used, an amount to yield the desired amount of elemental, or ferrous iron is added. To illustrate this as a packaged product to be sold, the following is an example:

EXAMPLE 12

| | |
|---|---|
| Ascorbic acid | 1.0 kilogram |
| Cysteine HCl | 6.5 grams |
| Elemental Iron | 100 grams (316 grams ferrous sulfate) |

This example shows that the hydrochloride of cysteine may be used and it or another physiologically acceptable salt may be used if the amount employed will yield the appropriate amount of the cysteine base. Such a cysteine salt may be used in any of the other examples. Instead of the elemental powdered iron, a metabolically available ferrous or ferric compound may be used, such as the ones mentioned above, provided that the amount employed will yield the appropriate amount of the iron ion. These ferrous and ferric compounds and elemental iron are interchangeable in the other examples. These equivalent agents are intended to be included in the claims.

Some of the above examples describe partial or entirely synthetic drinks in which the color is due to a dye acceptable for food consumption. It has been stated above that the stabilization of the ascorbic acid according to this invention has the added benefit of protecting the dyes and maintaining the color of the beverage. Representative color agents which have been added to the above beverages and found to be unexpectedly stable are the following:

Orange color 0.012 gm. Red No. 2
0.149 gm. Yellow No. 5
0.096 gm. Yellow No. 6

A sufficient amount is added to the beverage to similate the desired natural orange juice color.

Purple color 2.39 gm. Red No. 2
0.106 gm. Blue No. 1
0.106 gm. Yellow No. 5

A sufficient amount is added to the beverage to similate the desired natural grape juice color.

It is to be understood that in the above examples the amounts of Vitamin C, cysteine and iron can be varied within the ranges set forth above and in the claims.

We claim:

1. A beverage containing Vitamin C in the amount of 0.025 to 1.2 mg./ml. and 0.0007 to 0.07 mg./ml. of metabolically available iron measured as Fe based on a single strength drink and having added to said beverage cysteine amounting to 0.2 to 2.3% by weight of the Vitamin C.

2. The beverage of claim 1 in which said iron content is 0.007 mg./ml.

3. A composition for fortifying a beverage having, in the following ratio, the ingredients consisting essentially of:
   1 kilogram of Vitamin C
   2 to 23 grams of cysteine.

4. The composition of claim 3 containing 2 to 12.5 grams of cysteine.

5. The composition of claim 3 containing 3 to 9 grams of cysteine.

6. A composition for fortifying a beverage having, in the following ratio, the ingredients consisting essentially of:
   1 kilogram of Vitamin C
   2 to 23 grams of cysteine
   28 to 58 grams of metabolically available iron measured as Fe.

7. The composition of claim 6 containing:
   2 to 12.5 grams of cysteine
   30 grams of iron.

8. The composition of claim 6 containing:
   3 to 9 grams of cysteine
   30 grams of iron.

9. The method of stabilizing the Vitamin C content of a beverage containing Vitamin C in the amount of 0.025 to 1.2 mg./ml. based on a single strength drink which comprises adding to said beverage from 0.2 to 2.3% of cysteine by weight of the Vitamin C.

10. The method of claim 9 in which the Vitamin C content of the beverage is 0.1 to 0.3 mg./ml.

11. The method of claim 9 in which the Vitamin C content of the beverage is 0.228 mg./ml.

12. The method of claim 9 in which there is added 0.2 to 1.25% of cysteine by weight of the Vitamin C.

13. The method of claim 9 in which there is added 0.3 to 0.9% of cysteine by weight of the Vitamin C.

14. The method of stabilizing the Vitamin C content of a beverage containing Vitamin C in the amount of 0.025 to 1.2 mg./ml. and 0.0007 to 0.07 mg./ml. of metabolically available iron measured as Fe based on a single strength drink which comprises adding to said beverage from 0.2 to 2.3% of cysteine by weight of the Vitamin C.

15. The method of claim 14 in which the iron content of the beverage is 0.07 mg./ml.

* * * * *